UNITED STATES PATENT OFFICE.

HYYM E. BUC, OF ROSELLE, NEW JERSEY, ASSIGNOR TO STANDARD OIL COMPANY, OF BAYONNE, NEW JERSEY, A CORPORATION OF NEW JERSEY.

ART OF CHLORINATION.

1,391,758. Specification of Letters Patent. Patented Sept. 27, 1921.

No Drawing. Application filed November 22, 1920. Serial No. 425,748.

*To all whom it may concern:*

Be it known that I, HYYM E. BUC, a citizen of the United States, residing at 620 Locust street, Roselle, in the county of Union and State of New Jersey, have invented a new and useful Improvement in the Art of Chlorination, of which the following is a specification.

The present invention relates to the production of chlorinated hydrocarbon derivatives, and will be clearly understood from the following description thereof.

In carrying out the present invention chlorinated hydrocarbons are produced by the direct action of chlorin upon isopropyl alcohol under suitable temperature conditions. The formation of chlorinated hydrocarbons proceeds at temperatures above 35° C.; however, at temperatures below 65–70° C. the proportion of chloracetones simultaneously formed is so large that it is preferred to maintain the temperature of reaction above 65–70° C. Chlorin gas is passed into contact with the isopropyl alcohol maintained at reacting temperatures until the desired degree of chlorination is effected. The products appear to consist principally of chlor-propanes, although some chlor-propenes may likewise be present.

The chlorination may suitably be effected by bringing a body of isopropyl alcohol, which may contain water, to boiling temperature under a reflux condenser adequate for refluxing the evolved vapors, and passing chlorin through the boiling alcohol. The initial temperature of reaction will be the boiling point of the alcohol, which in the case of the constant boiling point mixture with water, will be about 80° C. and in the case of other alcohol mixtures will be higher. As chlorination proceeds the boiling point of the mixture rises. When it exceeds 85° C. during further chlorination, the temperature of reaction is preferably maintained at a temperature not lower than 85° C. The chlorinated product is a heavy, immiscible liquid, which settles out at the termination of the reaction, and may be drawn off from the remaining reaction products. The end point of the reaction may be determined by the density of the chlor-propane mixture. For example, a product having a density corresponding to that of chloroform or of carbon tetrachlorid may be obtained, with similar solvent properties and resistance to combustion.

When temperatures lower than 65 to 70° C. are employed, lower chlor-propanes are formed, together with large proportions of chloracetones, including dichloracetone (asym.), trichloracetone (1.3.3), tetrachloracetone (sym.) and pentachloracetone. The chlor-propanes may be substantially separated from this mixture by fractionally distilling off the portion boiling below 118° C., the boiling point of the asym. dichloracetone.

The chlor-propanes may be employed as such or may be hydrolyzed to form polyhydric alcohols or may be esterified, as desired. The term "chlor-propanes" as used herein is intended to designate the chlorinated hydrocarbons of three carbon atoms including chlor-propanes, if any be formed.

I claim:

1. The process of forming chlor-propanes which comprises passing chlorin into isopropyl-alcohol while maintaining a temperature above 65–70° C.

2. The process of forming chlor-propanes which comprises passing chlorin into boiling isopropyl-alcohol.

3. The process of forming chlor-propanes which comprises passing chlorin into boiling isopropyl-alcohol and refluxing into the reacting liquid the vapors evolved.

4. The process of forming chlor-propanes which comprises passing chlorin into boiling isopropyl-alcohol, continuing the passage of chlorin into the reacting liquid while maintaining it at boiling temperature until its boiling point reaches 85° C. and while subsequently maintaining the temperature of the liquid at not lower than 85° C.

HYYM E. BUC.